Nov. 15, 1966  C. A. WETSCH  3,285,360
FISHING ALARM DEVICE
Filed Oct. 12, 1964

INVENTOR
Clemens A. Wetsch

BY *Robert E. Kline*

ATTORNEY

# United States Patent Office 3,285,360
Patented Nov. 15, 1966

3,285,360
FISHING ALARM DEVICE
Clemens A. Wetsch, 1401 6th St., SW., Minot, N. Dak.
Filed Oct. 12, 1964, Ser. No. 403,016
1 Claim. (Cl. 43—17)

This invention relates to fishing apparatus, more particularly, the invention relates to a device for supporting a fishing pole and sounding an alarm if a fish is caught on the line.

It is an object of the invention to provide a novel simplified fishing alarm device which can easily be operated and installed and removed from the ground.

It is a further object of the invention to provide an improved fishing alarm device having a novel L-shaped support with a simplified fishing pole socket mounting construction.

It is a further object of the invention to provide a novel improved simplified fishing device which can be easily manufactured in a minimum of time and expense.

Further objects and advantages of the invention will become apparent as the description proceeds and when taken in conjunction with the accompanying drawing, wherein.

Figures 1, 2, 3, 4:
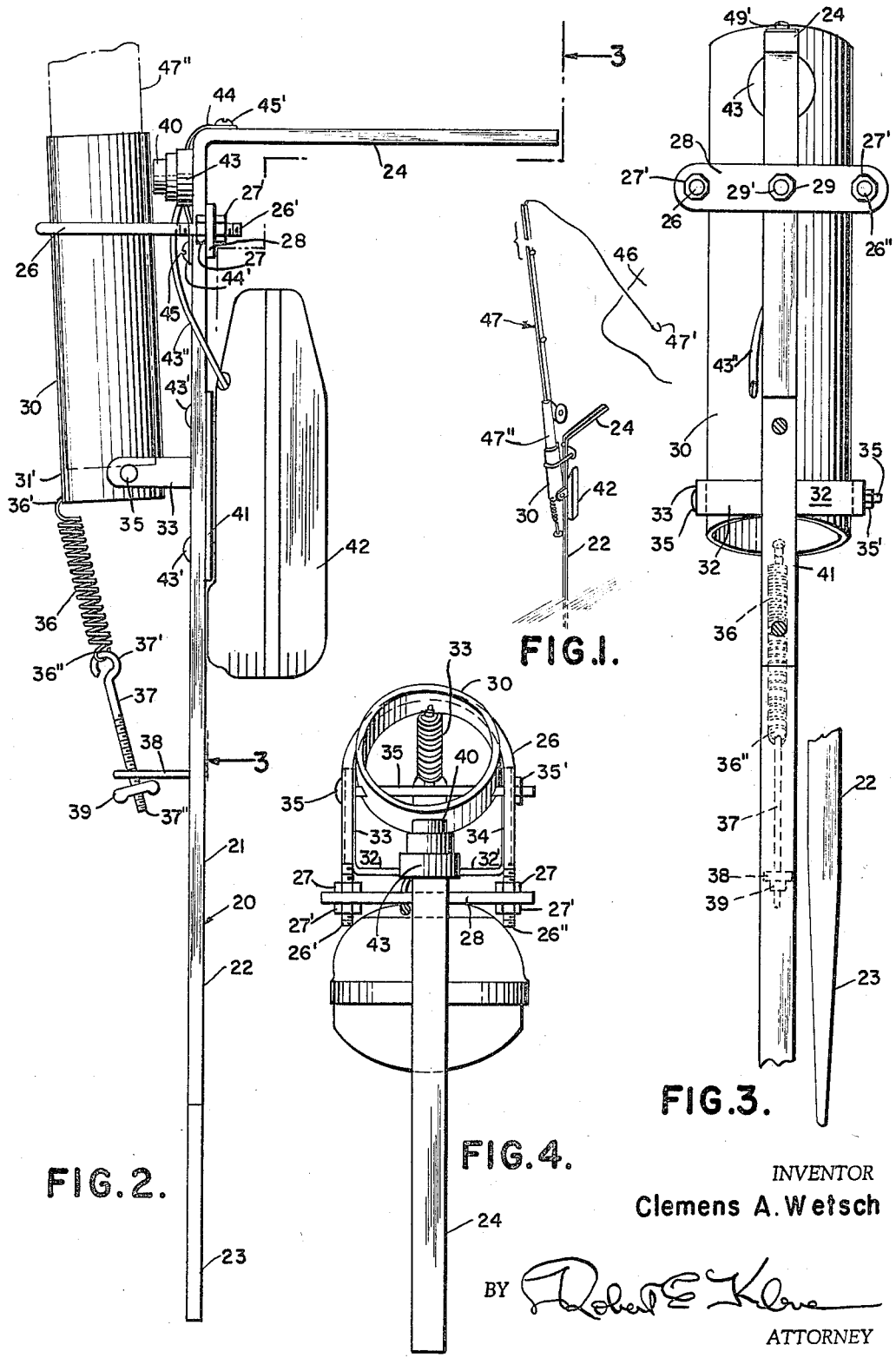
FIGURE 1 is a perpective view of the fishing alarm invention shown installed in the ground and with the fishing pole attached.
FIGURE 2 is a side elevational view of the fishing alarm device.
FIGURE 3 is a cross-sectional view of the fishing alarm invention taken along line 3—3 of FIGURE 1.
FIGURE 4 is a top elevational view of the fishing alarm device.

Briefly stated, the invention comprises an L-shaped rod in inverted relation, with the vertical leg of the rod forming a spike at its lower end, and with the other leg of the rod projecting laterally and acting as a handle, a U-shaped bracket is mounted to the vertical leg and a socket is pivotally mounted within the confines of the bracket. The invention further includes a button operated horn which is activated by the movement of the socket and which socket is adapted to receive the handle of a fishing pole, and a spring connection between the socket and the vertical arm which urges the socket away from the button of the horn.

Referring more particularly to the drawings, the fishing alarm invention is generally referred in FIGURES 1 and 2, by the numeral 20. The fishing alarm invention 20 has an elongated L-shaped rod 21, with a substantially uniform rectangular cross-section. The vertical arm portion 22 of the L-shaped rod 21 has a tapered lower end forming a spike 23. The horizontal portion 24 of the L-shaped rod acts as a handle. A U-shaped rod 26 is mounted adjacent to the upper portion of the vertical rod portion by means of a pair of nuts 27 and 27′ which are threaded onto the threaded ends 26′ and 26″ of the U-shaped rod, on opposite ends of a plate 28, to secure the ends of the U-shaped rod to the plate 28.

The plate 28 is secured to the vertical rod portion by means of a nut 29 and bolt 29′. A cylindrical metal tube or sleeve 30 has its lower end 31 pivotally mounted to the vertical arm portion 27, by means of a U-shaped plate 32. The U-shaped plate 32 is welded to vertical rod portion, at the flat apex 32′. The projecting legs 33 and 34 of the U-shaped plate 32 each has a bore at its outer end and a bolt 35 passes through. The bolt 35 also passes through bores in the opposites of the lower end of the sleeve 30, and a nut 35′ is threaded onto the other end of the bolt to secure the sleeve in the U-shaped plate 32 in pivoting relation.

At the outer lower end of the sleeve 30 is a coil spring 36, which has its upper end 36′ hooked through a hole in the sleeve 30, and its lower end 36″ hooked through an eyelet 37′ in the screw 37. The screw 37 has a threaded lower end 37″ which passes downward through the bore in a projecting ledge or plate 38. The plate 38 projects perpendicular from the vertical rod portion 22 and is welded thereto, at its inner end. A wing nut 39 is threaded onto the screw 37, beneath the ledge, and turning the wing nut in one direction relative to the screw 37, draws the screw downward thereby drawing the spring downward. This urges the sleeve in against the U-shaped portion of the U-bolt 26, keeping it away from the button 40.

On the opposite side of the vertical arm portion, from the sleeve 30, is an elongated rectangular plate 41. A battery operated horn 42, is secured to the vertical arm portion with the plate 41, therebetween, by a pair of screws 43′ which pass through the vertical rod portion and the rectangular plate 41 and are threaded into bores in the horn 42.

The button 40 has a casing 43, and the button 40 is depressible into the casing. The depressing of the button closes a switch within the housing, and activates the horn 42. Wires 43″ connect the button and its switch to the horn, and the horn and switch and connection are of a conventional construction.

A pair of projecting metal tongues 44 and 44′ project from the casing 43 of the button operated switch, and screws 45 and 45′ pass through apertures in the tongues, with one screw 45 being threaded into horizontal rod portion 24 and the other screw 45′ being threaded into the vertical rod portion 22, to secure the button operated switch to the L-shaped rod 21.

The fishing alarm device is operated by forcing down on the handle 24 thereby forcing the spiked end 23 of the L-shaped rod 21 into the ground adjacent a lake 46.

The line of a conventional fishing pole 47 is suitably prepared for still fishing, generally shown by a hook 47′ and is cast into the lake 46 presumably with a bobber or float attached. The handle 47″ of the fishing pole 47 is then inserted into the metal sleeve 30 until its lower end reaches the level indicated by numeral 31′ where it abuts the rod 35 at the bottom of the sleeve. If a fish catches onto the line it will draw the fishing pole toward the lake, pivoting the handle 47″ and sleeve 30 in a clockwise direction about the axis of the rod 35, as viewed from FIGURE 2, causing the upper end of the sleeve 30 to engage and depress the button 40 thereby sounding or activating the horn and thereby telling the operator that a fish is caught on the line.

The fishing alarm device may be removed from the ground by simply lifting up on the handle 24. Also the handle 24 makes it easy to carry the apparatus from place to place. The U-shaped rod 26 acts to guide the sleeve in its pivotal movement, with the legs and the round apex of the U-shaped rod acting to prevent the sleeve and the fishing pole carried in the sleeve from wobbling from side to side.

It will be obvious that various changes and departures may be made in the invention without departing from the spirit and scope thereof, and accordingly it is not intended that the invention be limited to that specifically described in the specification or shown in the drawing, but only as set forth in the appended claim wherein what is claimed is:

A fishing alarm device, comprising an inverted L-shaped support, one leg of said L-shaped support having a tapered lower end and adapted to be introduced vertically into the ground, the other leg of said support projecting laterally from said first leg and adapted to serve as a handle for carrying such device, a plate mounted to said one leg, a U-shaped rod secured to said plate at the outer ends of its legs, a cylindrical sleeve adapted to move within the confines of said U-shaped rod, the U-shaped portion of said U-shaped rod providing an arcuate surface corresponding to the curvature of the cylindrical sleeve, a bracket below said U-shaped rod, said sleeve at its lower end being pivotally mounted to said bracket, a horizontally projecting ledge beneath said bracket, a coil spring hooked at one end to the outer lower edge of said sleeve and at the other end to the eyelet of a screw, said screw having its threaded end passing through a bore in said horizontally projecting ledge, a nut beneath said ledge to draw said screw downward so as to draw said spring downward thereby urging said sleeve outward against the U-shaped portion of said rod, a button mounted to said one leg adjacent the inner upper edge of said sleeve, a battery operated horn mounted to said vertical rod portion adapted to be actuated by said button, said sleeve being adapted to receive a fishing pole, whereby when a fish strikes the hook at the end of the line of the fishing pole it will pivot the pole and sleeve toward the button and engage the button with the button activating the horn, said spring acting to urge said sleeve movably away from said button.

References Cited by the Examiner
UNITED STATES PATENTS

| | | | |
|---|---|---|---|
| 2,275,870 | 3/1942 | Sheldon | 248—38 X |
| 2,909,860 | 10/1959 | Braun | 43—17 |
| 3,156,997 | 11/1964 | Smith | 43—17 |

SAMUEL KOREN, *Primary Examiner.*

D. J. LEACH, *Assistant Examiner.*